United States Patent
Eswaran et al.

(10) Patent No.: US 8,131,841 B2
(45) Date of Patent: Mar. 6, 2012

(54) METHOD AND APPARATUS FOR DETECTING PREDEFINED SIGNATURES IN PACKET PAYLOAD

(75) Inventors: Anand Eswaran, Bangalore Karnataka (IN); Ravindra Guntur, Mysore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 459 days.

(21) Appl. No.: 12/165,668

(22) Filed: Jul. 1, 2008

(65) Prior Publication Data

US 2009/0030895 A1 Jan. 29, 2009

(30) Foreign Application Priority Data

Jul. 27, 2007 (IN) .............................. 1635/CHE/2007

(51) Int. Cl.
*G06F 15/173* (2006.01)
*G06F 13/00* (2006.01)

(52) U.S. Cl. .................. 709/224; 711/108; 709/223

(58) Field of Classification Search .......... 709/223–232; 711/108, 216

See application file for complete search history.

(56) References Cited

U.S. PATENT DOCUMENTS

| 6,011,795 | A  | * | 1/2000  | Varghese et al. | 370/392 |
|-----------|----|---|---------|-----------------|---------|
| 6,473,846 | B1 | * | 10/2002 | Melchior        | 711/170 |
| 7,039,764 | B1 | * | 5/2006  | Shetty et al.   | 711/133 |
| 7,193,874 | B1 | * | 3/2007  | Pereira et al.  | 365/189.15 |
| 2003/0014627 | A1 | * | 1/2003 | Krishna et al. | 713/153 |
| 2004/0083347 | A1 | * | 4/2004 | Parson         | 711/165 |
| 2007/0115986 | A1 | * | 5/2007 | Shankara       | 370/392 |
| 2008/0028467 | A1 | * | 1/2008 | Kommareddy et al. | 726/23 |

* cited by examiner

Primary Examiner — Yasin Barqadle

(57) ABSTRACT

A method and apparatus for detecting predefined signatures in packet payload is disclosed. In one embodiment, a method of string matching in a network packet payload includes performing hash on a current search string received in the network packet payload to generate respective search string hash values, storing the search string hash values in a hash buffer, performing rehash using the search string hash values to generate an associated search string rehashed value, performing a parallel search of the search string rehashed value against Content Addressable Memory (CAM) entries to determine if the search string rehashed value matches with one of the CAM entries, and identifying the current search string in the network packet payload as a match with one of the CAM entries based on the outcome of performing the parallel search.

20 Claims, 3 Drawing Sheets

METHOD AND APPARATUS FOR DETECTING PREDEFINED SIGNATURES IN PACKET PAYLOAD

FILED OF THE INVENTION

The present invention relates generally to computer and communication networks and more particularly relates to techniques for performing string searches in packet payloads.

BACKGROUND

Network devices, such as switches and/or routers, are designed to forward network traffic, in the form of packets, at high line rates. One of the most important considerations for handling network traffic is packet throughput. To accomplish this, special-purpose processors known as network processors have been developed to efficiently process very large number of packets per second. In order to process a packet, the network processor (and/or network equipment employing the network processor) needs to extract data from a packet header indicating destination of the packet, class of service, etc., store the payload data in memory, perform packet classification and/or queuing operations, determine a next hop for the packet, select an appropriate network port to forward the packet, etc. These operations are generally referred to as "packet processing" operations.

In addition to the foregoing packet forwarding operations, there may be a need to search packet payloads for a given string or a set of strings. For example, security applications may need to search for certain strings indicative of a virus or Internet worm that is present in the packet payload, such as for load balancing and/or billing purposes.

Searching packet payloads presents a problem with respect to line-rate packet forwarding. The reason for this is that string searches may be very time consuming, especially, if the strings are relatively long. With the network line rates significantly increasing every year, it is becoming increasingly difficult for software and/or hardware based solutions to operate at these increasing line rates.

One of the current techniques monitors signatures in a network packet payload by storing a predefined signature of a predetermined length in one of a plurality of traditional Bloom filters. Further, a data stream on the network is monitored for a signature which corresponds to the predefined signature. Furthermore, using an analyzer, whether the network signature corresponds to the predefined signature and is a false positive, is determined. These techniques, using the Bloom filters, are used for pattern matching applications, such as network security, application specific service differentiation, QoS enhancement and/or network engineering and so on.

Current techniques also use counting Bloom filters that substitute bit-array with a counter-array to maintain per-flow statistics, such as packet/byte count and the like. Each entry in a bit-array is replaced with an n-bit wide counter in the counting Bloom filters. Also, each time a packet arrives, the Bloom filters apply Bloom hash function, generate an index I and a counter that is indexed by I in the Bloom array is incremented.

However, this process imposes the need for an n-bit wide data bus to transfer the counter content back and forth from the Bloom hash function unit. Further, such implementations can be hardware intensive as they may require a large number of Bloom filter hash units, increase in the width of the data-bus to support counter-fields that can result in noticeable speed reduction for a wide-bit vector. In addition, these techniques can require complicated Application Specific Integrated Circuit (ASIC) layout. Furthermore, Bloom filters can require a wide bit array for long string bit searches that can result in significant hardware complexity.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method and apparatus for detecting predefined signatures in packet payload is disclosed. In the following description, for purposes of explanation, numerous specific details are set forth in order to provide a thorough understanding of the various embodiments. It will be evident, however, to one skilled in the art that the various embodiments may be practiced without these specific details.

The terms "search string" and "packet" are used interchangeably throughout the document.

Figure 1:
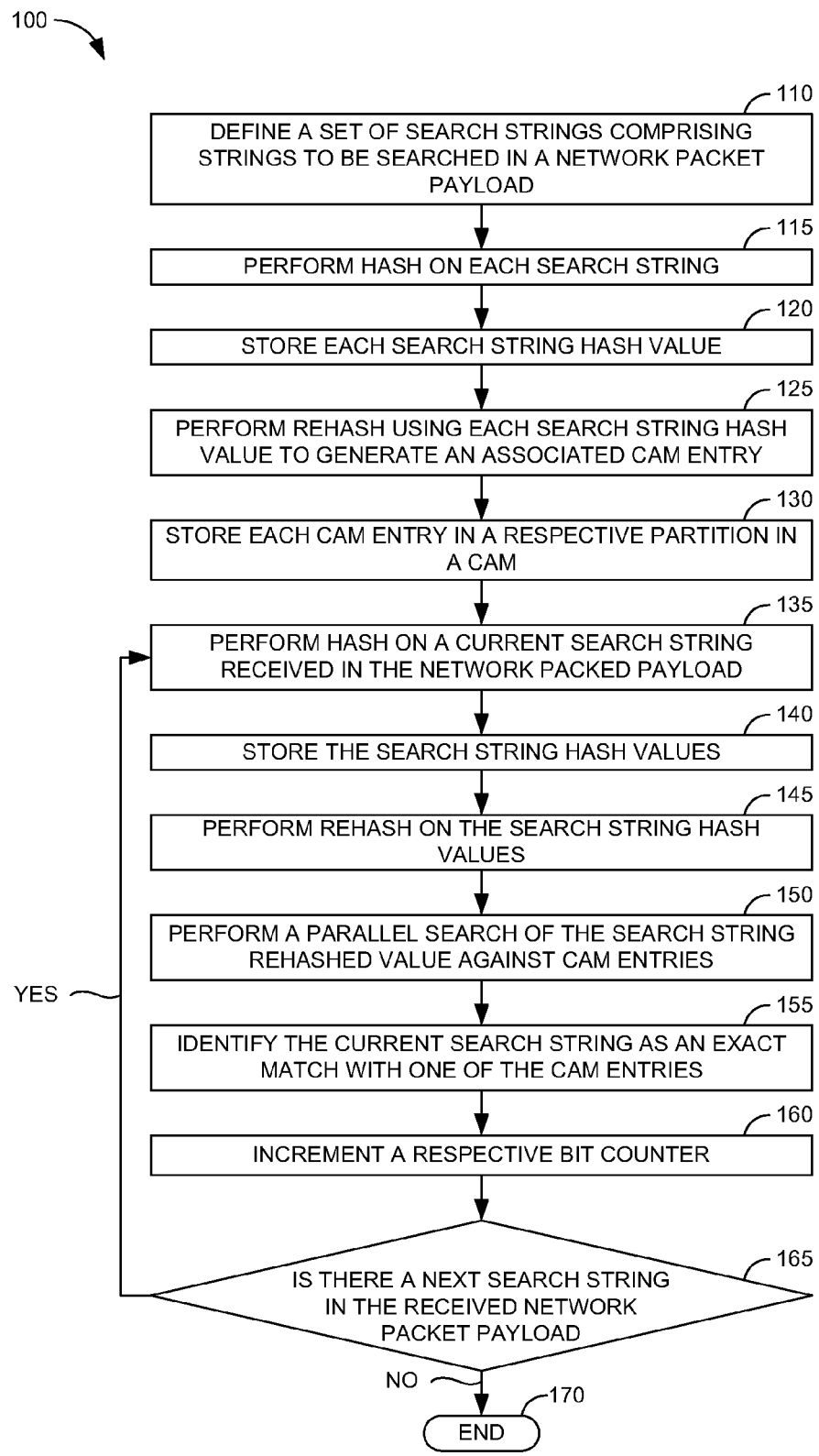
FIG. 1 is a process flow illustrating a string matching in a network packet payload, according to one embodiment.

FIG. 1 is a process flow 100 illustrating a string matching in a network packet payload, according to one embodiment. In operation 110, a set of search strings comprising strings to be searched in the network packet payload is defined. In operation 115, hash on each search string is performed to generate respective search string hash values. In operation 120, each of the search string hash values are stored in a hash buffer. In operation 125, rehash using each of the search string hash values is performed to generate an associated Content Addressable Memory (CAM) entry. In operation 130, the CAM entry associated with each search string is stored in a respective partition in a CAM. In some embodiments, each CAM entry is loaded into a respective partition in the CAM.

The above outlined operations 110-130 pertains to learning and/or initial phase of the process flow. In these embodiments, a hash unit used to convert the search string to one or more search string hash values (i.e., to k-tuple) and further to obtain the associated CAM entry can be based on mod ($2^n$) function that is implemented using a shift function.

In operation 135, hash is performed on a current search string received in the network packet payload to generate respective search string hash values. In some embodiments, one or more search string hash values are generated based on variable-sized hash blocks of the current search string. In these embodiments, a cluster of Bloom filters configured by trusted remote software, such as Simple Network Management Protocol (SNMP) management station, is used during switch boot-up time. The Bloom filters partition the current search string into sub-search strings, where each sub-search string works on different portions of the current search string, such as data-link header, Internet Protocol (IP) header, layer 4 headers, payload and so on, to parallelize the operation. For example, each search string can have sub-strings of type H2, H3, H4 and so on, wherein HX refers to a layer X header, with the possibility of one or more headers being absent. In these embodiments, each Bloom filter accepts as input—associated sub-search strings of the search string, performs hashing and outputs k hash values in the range of 1 to Ri.

In operation 140, the generated search string hash values are stored in the hash buffer. In operation 145, rehash is performed using the generated search string hash values to generate an associated search string rehashed value. In operation 150, a parallel search of the search string rehashed value against CAM entries is performed to determine if the search string rehashed value matches with anyone of the CAM entries.

In operation 155, the current search string is identified as an exact match with one of the CAM entries, if a match is found in the stored CAM entries in the CAM. In operation 160, a respective bit counter is incremented upon identifying the current search string in the network packet payload as a match. In some embodiments, the bit counter is a 32 bit counter.

In operation 165, the process flow 100 determines whether there is a next search string in the network packet payload that requires string matching. The process flow 100 goes to operation 170 and ends the string matching operation if there is no other search string in the network packet payload that requires string matching, otherwise goes to operation 135 and repeat operations 135-165 if there is another search string in the network packet payload that requires string matching.

In some embodiments, the process flow 100 further includes taking an appropriate action on the current search string in the network packet payload when a match is found with one of the CAM entries. Exemplary appropriate actions include dropping the packet, sending the packet for analysis, forwarding the packet, logging the packet and the like. In these embodiments, the network packet payload arrives as Transfer Control Protocol/Internet Protocol (TCP/IP) data.

Figure 2:
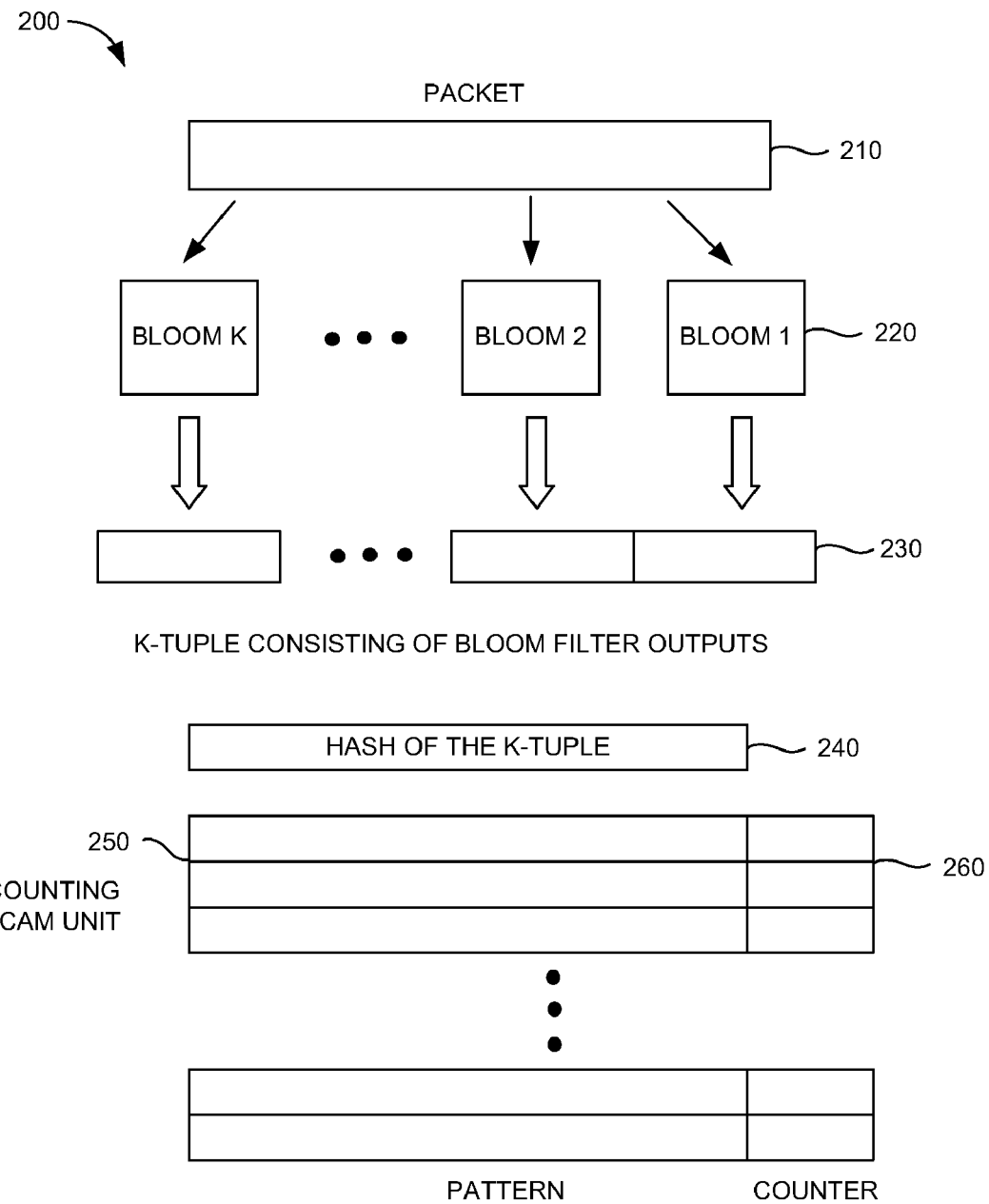
FIG. 2 is a block diagram illustrating a device for string matching in a network packet payload, according to one embodiment.

FIG. 2 is a block diagram illustrating a device 200 for string matching in a network packet payload, according to one embodiment. Particularly, FIG. 2 illustrates an incoming network packet payload 210, a hash processor 220, a hash memory 230, a rehash unit 240 and a CAM 250 coupled with a bit counter 260. In some embodiments, the CAM 250 is a Ternary Content Addressable Memory (TCAM).

In operation, during training and/or initial phase, the hash processor 220 defines a set of packets to be searched in the network packet payload. The hash processor 220 then performs hash on each packet to generate respective one or more hash values. The hash processor 220 then stores each of the one or more generated hash values in the hash memory 230. The hash processor 220 then performs rehash using each of the one or more generated hash values to generate an associated CAM entry. The hash processor 220 then loads the generated CAM entry into a respective partition in the CAM 250.

In operation, the hash processor 220 receives a current packet from the incoming network packet payload 210 and generates one or more hash values. In some embodiments, the hash processor 220 comprises a plurality of Bloom filters (Bloom 1, Bloom 2 . . . Bloom k). In these embodiments, the one or more hash values are generated based on variable-sized blocks of the current packet. The hash processor 220 then stores the one or more generated hash values in the hash memory 230.

The rehash unit 240 then generates a rehashed value using the one or more generated hash values. The CAM 250 then receives the generated rehashed value and performs a parallel search using the generated rehashed value against the CAM entries to determine if the rehashed value matches with one of the CAM entries. The CAM 250 then identifies the current packet as a match if the generated rehashed value matches with one of the CAM entries. In these embodiments, the CAM 250 performs the parallel search of the rehashed value against CAM entries and identifies the current packet as a match if the rehashed value matches with one of the CAM entries. In some embodiments, the CAM increments a respective bit counter 260 upon identifying the current packet as a match.

Further, the hash processor 220 determines availability of a next packet in the network packet payload that requires packet matching. Based on an outcome of the determination, the hash processor 220 repeats the above described operation for the next available packet. The operation of the device 200 for string matching/packet matching is explained in more detail with respect to FIG. 1.

In some embodiments, the hash processor 220 can be implemented in hardware by using bits of k-index tuple to gate relevant array entries in an array filled with random values in the range of 1 to N-1. Further, a parallel XOR operation of all the gated elements results in a random value in the range of 1 to N-1. It can be seen that depending on the k-index tuple, the random value in the range of 1 to N-1, where each CAM entry is $\log\_2 (N)$ bits wide, is generated. The CAM 250 then checks if this random value is present as one of the CAM entries and if so, increments a respective bit counter 260.

Figure 3:
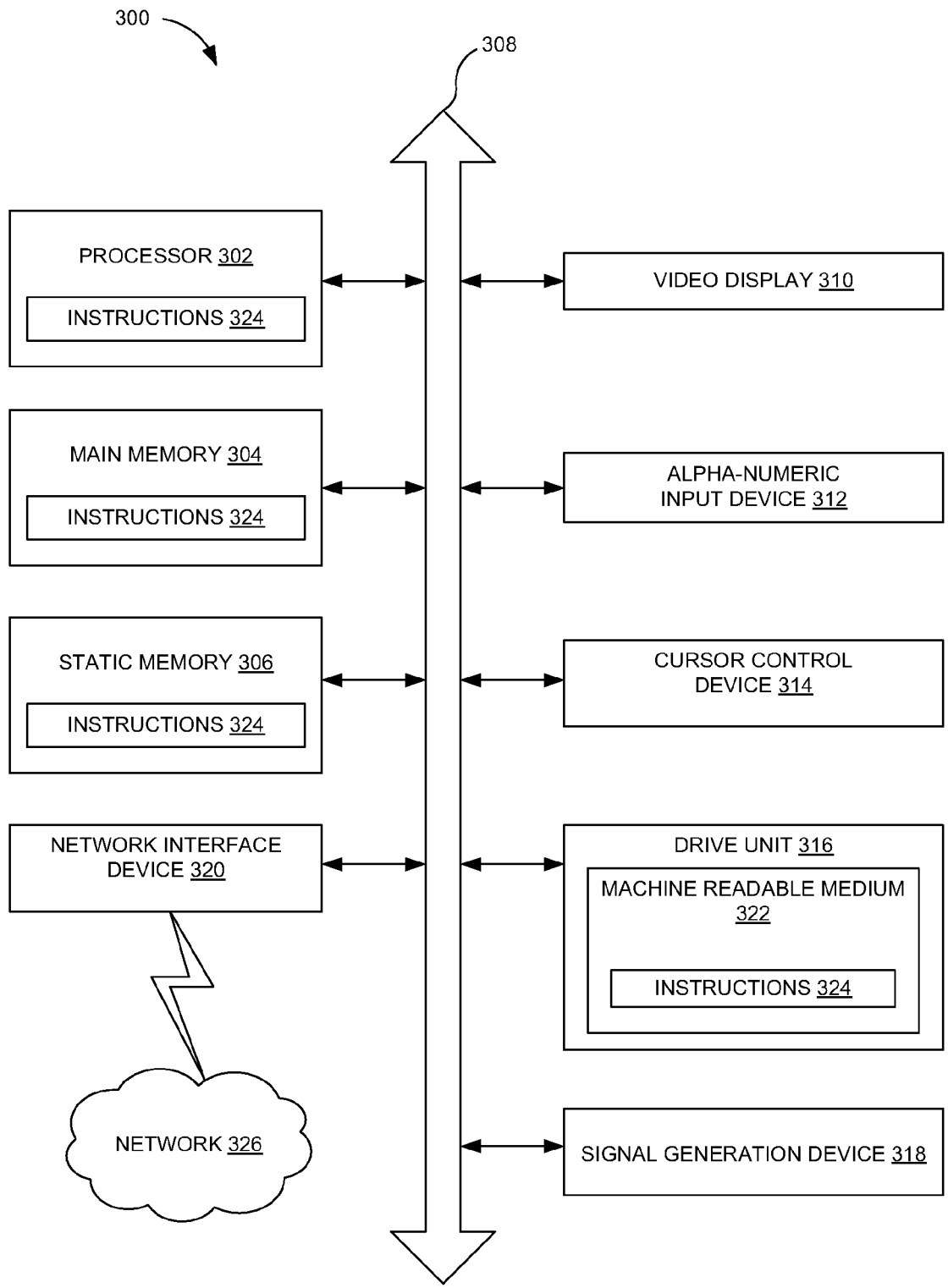
FIG. 3 is a diagrammatic system view of a data processing system in which any of the embodiments disclosed herein may be performed, according to one embodiment.

FIG. 3 is a diagrammatic system view 300 of a data processing system in which any of the embodiments disclosed herein may be performed, according to one embodiment. Particularly, the diagrammatic system view of FIG. 3 illustrates a processor 302, a main memory 304, a static memory 306, a bus 308, a video display 310, an alpha-numeric input device 312, a cursor control device 314, a drive unit 316, a signal generation device 318, a network interface device 320, a machine readable medium 322, instructions 324 and a network 326.

The diagrammatic system view 300 may indicate a personal computer and/or a data processing system in which one or more operations disclosed herein are performed. The processor 302 may be a microprocessor, a state machine, an application specific integrated circuit, a field programmable gate array, etc. (e.g., Intel® Pentium® processor). The main memory 304 may be a dynamic random access memory and/or a primary memory of a computer system. The static memory 306 may be a hard drive, a flash drive, and/or other memory information associated with the data processing system.

The bus 308 may be an interconnection between various circuits and/or structures of the data processing system. The video display 310 may provide graphical representation of information on the data processing system. The alpha-numeric input device 312 may be a keypad, keyboard and/or any other input device of text (e.g., a special device to aid the physically handicapped). The cursor control device 314 may be a pointing device such as a mouse. The drive unit 316 may be a hard drive, a storage system, and/or other longer term storage subsystem.

The signal generation device 318 may be a bios and/or a functional operating system of the data processing system. The network interface device 320 may perform interface functions (e.g., code conversion, protocol conversion, and/or buffering) required for communications to and from the network 326 between a number of independent devices (e.g., of varying protocols). The machine readable medium 322 may provide instructions on which any of the methods disclosed herein may be performed. The instructions 324 may provide source code and/or data code to the processor 302 to enable any one/or more operations disclosed herein.

For example, a storage medium having instructions, that when executed by a computing platform executes a method for a high probability string matching in a network packet payload, includes performing hash on a current search string received in the network packet payload to generate respective search string hash values for the current search string, storing the search string hash values in a hash buffer, performing rehash using the search string hash values to generate an associated search string rehashed value, performing a parallel search of the search string rehashed value against CAM entries to determine if the search string rehashed value matches with one of the CAM entries, and identifying the current search string in the network packet payload as a match with one of the CAM entries based on the outcome of performing the parallel search.

The storage medium may have instructions to increment a respective bit counter upon identifying the current search string in the network packet payload as a match. Further, the storage medium may have instructions to repeat the steps of performing hash, storing, performing rehash, performing a parallel search, identifying, and incrementing on a next search string received in the network packet payload.

The storage medium may have instructions to define a set of search strings comprising strings to be searched in the network packet payload, to perform hash on each search string for generating respective search string hash values, to store each of the search string hash values in the hash buffer, to perform rehash using each of the search string hash values to generate an associated CAM entry, and to store the CAM entry associated with each search string in a CAM. In addition, the storage medium may have instructions to load each CAM entry into a respective partition in the CAM. The storage medium may also have instructions to take an appropriate action, such as dropping the packet, sending the packet for analysis, forwarding the packet and logging the packet, on the current search string in the network packet payload upon match with one of the CAM entries.

Furthermore, a computer system includes a processing unit and a memory coupled to the processor. The memory has code stored therein for high probability string matching in a network packet payload. The code causes the processor to perform hash on a current search string received in the network packet payload for generating respective search string hash values for the current search string, to store the search string hash values in a hash buffer, to perform rehash using the search string hash values to generate an associated search string rehashed value, to perform a parallel search of the search string rehashed value against CAM entries to determine if the search string rehashed value matches with one of the CAM entries, and to identify the current search string in the network packet payload as a match with one of the CAM entries based on an outcome of the parallel search.

The above technique is an alternative to using counting Bloom filters that can be implemented using CAMs and/or TCAMs coupled with a simple counting unit. The above-described technique is easier to implement as a hardware solution and is simpler to implement than a traditional counting Bloom filter as it can reduce the number of required memory fetches. The above technique can be implemented in applications, such as intrusion detection systems, network traffic monitoring devices, hardware load balancers, and/or virus detection systems and so on.

Further, the above technique can yield significantly lower false-positive rate (i.e., the probability of wrong flows falling into the same bucket due to hash collisions) compared with a traditional counting Bloom filter as it uses k hash functions compared with one hash function in the traditional Bloom filter setup. Further, the above technique yields a significantly lower false-positive rate without using complex hardware architecture, such as the counting Bloom filters.

Also, the method may be in a form of a machine-readable medium embodying a set of instructions that, when executed by a machine, cause the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of string matching in a network packet payload, comprising:
    performing hash on a current search string received in the network packet payload to generate respective search string hash values;
    storing the search string hash values in a hash buffer;
    performing rehash using the search string hash values to generate an associated search string rehashed value;
    performing a parallel search of the search string rehashed value against Content Addressable Memory (CAM) entries to determine if the search string rehashed value matches with one of the CAM entries; and
    identifying the current search string in the network packet payload as a match with one of the CAM entries based on the outcome of performing the parallel search.

2. The method of claim 1, further comprising:
    incrementing a respective bit counter upon identifying the current search string in the network packet payload as a match.

3. The method of claim 2, wherein the bit counter is a 32 bit counter.

4. The method of claim 2, further comprising:
    repeating the steps of performing hash, storing, performing rehash, performing a parallel search, identifying, and incrementing on a next search string received in the network packet payload.

5. The method of claim 1, further comprising:
    defining a set of search strings comprising strings to be searched in the network packet payload;
    performing hash on each search string to generate respective search string hash values;
    storing each of the search string hash values in the hash buffer;
    performing rehash using each of the search string hash values to generate an associated CAM entry; and
    storing the CAM entry associated with each search string in a CAM.

6. The method of claim 5, further comprising;
    loading each CAM entry into a respective partition in the CAM.

7. The method of claim 1, wherein performing hash on the current search string received in the network packet payload to generate respective search string hash values comprises:
    employing a plurality of Bloom filters to perform hash on the current search string received in the network packet payload to generate respective search string hash values for the current search string.

8. The method of claim 1, further comprising:
taking an appropriate action on the current search string in the network packet payload upon match with one of the CAM entries and wherein the appropriate action is selected from the group consisting of dropping the packet, sending the packet for analysis, forwarding the packet and logging the packet.

9. The method of claim 1, wherein the network packet payload arrives as TCP/IP data.

10. An article, comprising:
a storage device having instructions, that when executed by a computing platform, result in execution of a method of string matching in a network packet payload, comprising:
performing hash on a current search string received in the network packet payload to generate respective search string hash values;
storing the search string hash values in a hash buffer;
performing rehash using the search string hash values to generate an associated search string rehashed value;
performing a parallel search of the search string rehashed value against CAM entries to determine if the search string rehashed value matches with one of the CAM entries; and
identifying the current search string in the network packet payload as a match with one of the CAM entries based on the outcome of performing the parallel search.

11. The article of claim 10, further comprising:
incrementing a respective bit counter upon identifying the current search string in the network packet payload as a match.

12. The article of claim 11, further comprising:
repeating the steps of performing hash, storing, performing rehash, performing a parallel search, identifying, and incrementing on a next search string received in the network packet payload.

13. The article of claim 10, further comprising:
defining a set of search strings comprising strings to be searched in the network packet payload;
performing hash on each search string to generate respective search string hash values;
storing each of the search string hash values in the hash buffer;
performing rehash using each of the search string hash values to generate an associated CAM entry; and
storing the CAM entry associated with each search string in a CAM.

14. The article of claim 13, wherein storing the CAM entry comprises:
loading each CAM entry into a respective partition in the CAM.

15. The article of claim 10, further comprising:
taking an appropriate action on the current search string in the network packet payload upon match with one of the CAM entries and wherein the appropriate action includes dropping the packet, sending the packet for analysis, forwarding the packet and logging the packet.

16. A device for packet matching in a network packet payload, comprising:
a hash memory;
a hash processor coupled to the hash memory, wherein the hash processor is configured to receive a current packet from the network packet payload and generate one or more hash values, wherein the one or more generated hash values are based on variable-sized blocks of the current packet, and wherein the hash processor stores the one or more generated hash values in the hash memory;
a rehash unit coupled to the hash memory to generate a rehashed value using the one or more generated hash values; and
a CAM coupled to the rehash unit to receive the generated rehashed value and perform a parallel search using the generated rehashed value against CAM entries to determine if the rehashed value matches with one of the CAM entries, and wherein the CAM identifies the current packet as a match with the one of the CAM entries based on the outcome of the parallel search.

17. The device of claim 16, wherein the CAM comprises a bit counter associated with each CAM entry, wherein the CAM increments the respective bit counter upon identifying the current packet as a match.

18. The device of claim 17, wherein the CAM is a Ternary Content Addressable Memory (TCAM).

19. The device of claim 17, wherein the hash processor defines a set of packets to be searched in the network packet payload, wherein the hash processor performs hash on each packet to generate respective one or more hash values, wherein the hash processor stores each of the one or more hash values in the hash memory, wherein the hash processor performs rehash using each of the one or more hash values and generates an associated CAM entry, and wherein the hash processor loads the generated CAM entry into a respective partition in the CAM.

20. The device of claim 17, wherein the hash processor determines availability of a next packet in the network packet payload requiring the packet matching and computes one or more hash values, rehashes the one or more hash values and generates the rehashed value and performs a parallel search using the generated rehashed value against the CAM entries and identifies the next packet as a match with the one of the CAM entries based on the outcome of the parallel search.

* * * * *